US012719991B2

(12) United States Patent
Migishima

(10) Patent No.: US 12,719,991 B2
(45) Date of Patent: Aug. 25, 2026

(54) IMAGE READING SYSTEM, METHOD FOR CONTROLLING THE SAME, AND STORAGE MEDIUM

(71) Applicant: CANON KABUSHIKI KAISHA, Tokyo (JP)

(72) Inventor: Isao Migishima, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 264 days.

(21) Appl. No.: 18/438,238

(22) Filed: Feb. 9, 2024

(65) Prior Publication Data

US 2024/0275891 A1 Aug. 15, 2024

(30) Foreign Application Priority Data

Feb. 14, 2023 (JP) ................................ 2023-020463

(51) Int. Cl.
*H04N 1/00* (2006.01)

(52) U.S. Cl.
CPC ..... *H04N 1/00244* (2013.01); *H04N 1/00217* (2013.01); *H04N 1/00307* (2013.01)

(58) Field of Classification Search
CPC ........... H04N 1/00307; H04N 1/00217; H04N 1/00244
See application file for complete search history.

(56) References Cited

U.S. PATENT DOCUMENTS 11,586,699 B1 * 2/2023 Nelson .................. G06F 16/972
2017/0126926 A1 * 5/2017 Saito .................. H04N 1/00344

FOREIGN PATENT DOCUMENTS

JP 2016019061 A 2/2016

* cited by examiner

*Primary Examiner* — John R Wallace
(74) *Attorney, Agent, or Firm* — Canon U.S.A., Inc. IP Division

(57) ABSTRACT

An image reading apparatus receives from a second server an upload URL supplied with upload count information for transmitting image data to a first server, and transmits the image data to the URL when an amount of image data reaches a predetermined amount. The first server receives the predetermined amount of the image data from the image reading apparatus and combines the image data based on the upload count information. The second server transmits the upload URL received from a third server to the image reading apparatus. The third server includes a fourth transmission unit that transmits the upload URL supplied with the upload count information to the URL of the first server, and, when read processing is continuing, the upload URL supplied with incremented upload count information is transmitted.

8 Claims, 16 Drawing Sheets

FIG.13A
1301
1302
ORIGINAL TYPE: DOCUMENT
READ SIZE: A4
DATA FORMAT: PDF
1303
START READING
FIG.13B
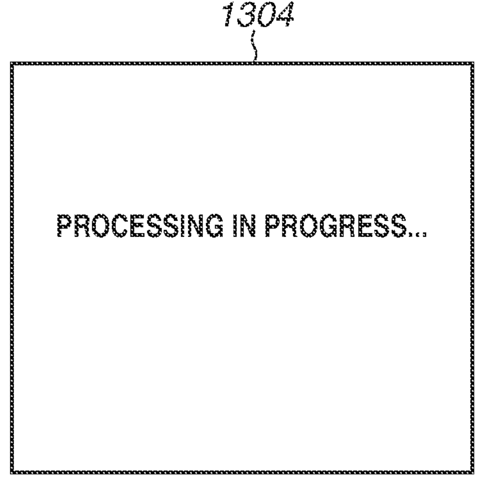
FIG.13C
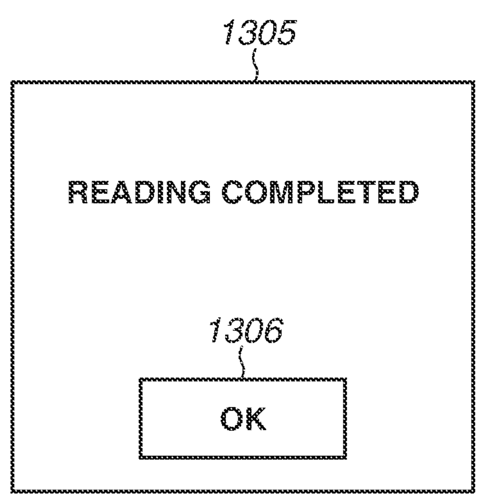
FIG.13D
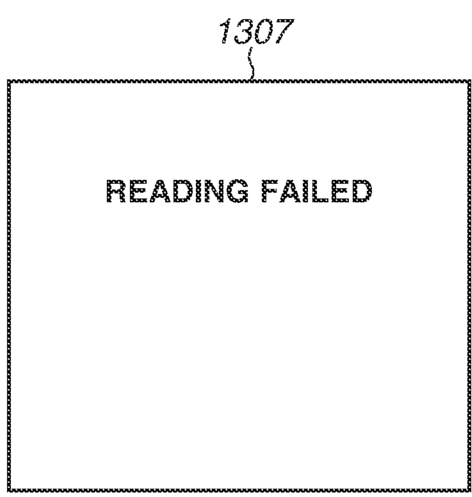

IMAGE READING SYSTEM, METHOD FOR CONTROLLING THE SAME, AND STORAGE MEDIUM

BACKGROUND

Field of the Disclosure

The present disclosure relates to an image reading system, a method for controlling the image reading system, and a storage medium.

Description of the Related Art

In recent years, there has been increasing number of services using the cloud environment called Social Network Services (SNSs) on the Internet. In services using the cloud environment, text and images are stored on servers from personal computers, smart phones, and other terminals, allowing users to share information. The use of an image reading apparatus to store images in the cloud environment enables reading a print product as images with less distortion than images captured by digital cameras. Japanese Patent Application Laid-Open No. 2016-019061 discloses a technique for integrating image acquisition from an image reading apparatus and image addition to a cloud environment, and performing operations from a terminal.

Japanese Patent Application Laid-Open No. 2016-019061 discusses processing for reading a document on a page basis, temporarily storing image data in a page buffer, and uploading the content of the page buffer to an image data storage server each time one page is read. In processing for sequentially performing read and transfer operations, the next document cannot be read during image data uploading. A reading apparatus capable of sequentially conveying documents by using an Auto Document Feeder (ADF) can continuously read documents. However, if the image data stored in the page buffer is transferred between pages of the document being read, a waiting time for data transfer arises. This waiting time for data transfer in addition to the document read time will cause an issue of degraded user convenience.

There is a transfer method that eliminates the need for a large-capacity storage device. This transfer method involves dividing a large amount of data, such as a collection of image data, into data segments (chunks) supplied with control information before transferring data. More specifically, a method prescribed in HyperText Transfer Protocol (HTTP) 1.1 Transfer-Encoding: chunked is known (hereinafter this method is referred to as "chunk transfer"). By providing a plurality of suitable small buffers for the read image data corresponding to the capacity of the page buffer, a simultaneous parallel operation including document reading and chunked image data transfer is implemented.

However, for the chunk transfer, the capacity of the entire image data to be eventually transferred is not specified but only the data size of each piece of chunk data can be specified. The chunk transfer is premised on the transfer of data with a comparatively small size, such as the transmission of character strings with an undefined length. Thus, if large-capacity data, such as image data, is transferred, an increase in the amount of server processing is expected.

The chunk transfer is based on Transmission Control Protocol (TCP)/Internet Protocol (IP) packet transmission, so that each individual data packet may be transmitted via a different communication path, which requires a server for receiving image data transmitted by the chunk transfer to confirm that the image data has been received in order. Further, there is an issue that processing for changing the order of image data is required, increasing the load on the server for receiving image data. The server for receiving image data has seldom performed processing on a standalone basis in recent years. Such a server is generally configured to connect with a virtual computing server via a content distribution high-speed server, an authentication server, and a load balancer server for load distribution. The above-described configuration requires the chunk transfer processing on these servers, which brings an issue of an increase in the total load on receive processing of the servers.

SUMMARY

In view of the issue, embodiments of the present disclosure are directed to providing an image reading system that divides image data generated in read processing by an image reading apparatus into data pieces with a predetermined amount, and transfers the data to an image upload server, thus reducing the load on a server for performing data transfer.

Embodiments of the present disclosure include the following configurations to solve the above-described issue.

According to embodiments of the present disclosure, an image reading system including a plurality of servers and an image reading apparatus connected with each other via a network includes a first reception unit configured to receive from a second server an upload Uniform Resource Locator (URL) supplied with upload count information for transmitting image data to a first server, a first transmission unit configured to transmit image data to the upload URL when an amount of read image data reaches a predetermined amount or when read processing is completed, a first notification unit configured to notify the second server of a first notification indicating that a scan job has been received, a second notification unit configured to, when the read processing is continuing in image data transmission by the first transmission unit, notify the second server of a second notification indicating that the processing is continuing, and a third notification unit configured to, upon completion of the processing, notify the second server of a third notification indicating that the processing is completed. The first server includes a second reception unit configured to receive a predetermined amount of the image data from the image reading apparatus, and a combining unit configured to, in response to an instruction of the third server, combine the image data based on the upload count information. The second server includes a requesting unit configured to, upon reception of the first or the second notification, request the third server for a notification indicating that the second notification has been received and the upload URL, a second transmission unit configured to transmit the upload URL received from the third server to the image reading apparatus, and a third transmission unit configured to, upon reception of the third notification, transmit a fourth notification indicating that the read processing is completed to the third server. The third server includes a fourth transmission unit configured to transmit to the second server the upload URL as the URL of the first server supplied with the upload count information. The fourth transmission unit includes an instruction unit configured to, upon reception of the notification indicating that the second notification has been received, transmit the upload URL supplied with incremented upload count information, and, upon reception of the fourth notification from the second server, instruct the first server to combine the transmitted image data.

Further features of the present disclosure will become apparent from the following description of exemplary embodiments with reference to the attached drawings.

BRIEF DESCRIPTION OF THE DRAWINGS

FIGS. 13A to 13D illustrate examples of screens of the mobile terminal.

DESCRIPTION OF THE EMBODIMENTS

Exemplary embodiments of the present disclosure will be described with reference to the accompanying drawings. Configurations described in the following exemplary embodiments are merely examples, and the present disclosure is not limited to the illustrated configurations.

Overall System Configuration

Figure 1:
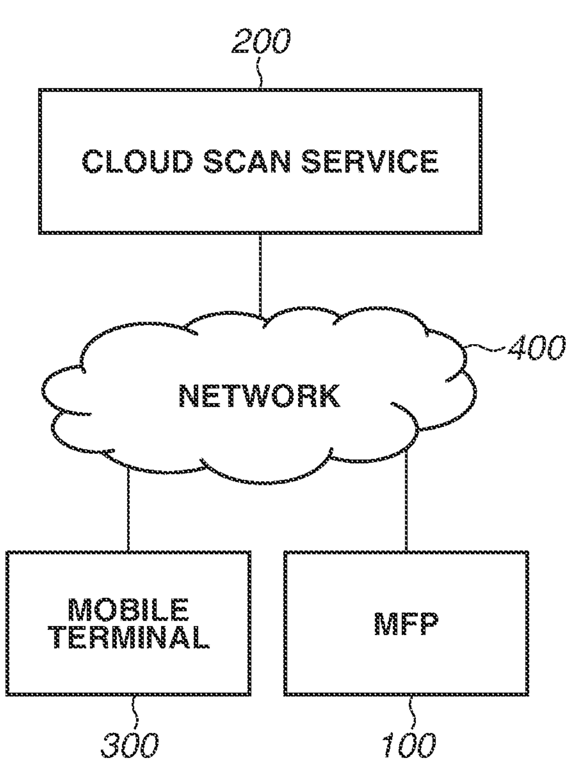
FIG. 1 illustrates a configuration of an image reading system according to an exemplary embodiment.

FIG. 1 illustrates an example of a configuration of an image reading system according to a first exemplary embodiment of the present disclosure. The system configuration according to the present exemplary embodiment is an example of a cloud scan system. In this configuration, a cloud scan service 200, a multi-function peripheral (MFP) 100, and a mobile terminal 300 are connected with each other via a network 400. The MFP 100 is an image processing application with a print function and a FAX function, as well as a read function. However, the MFP 100 is not limited thereto but may be a reading apparatus with a read function and a communication function. The cloud scan service 200 includes a plurality of servers, displays User Interface (UI) screens on the display of the mobile terminal 300, generates scan jobs in response to inputs to the UI screens through user operations, issues reading instructions to the MFP 100, and acquires image data. The network 400 according to the present exemplary embodiment may be the Internet or a Local Area Network (LAN). The network 400 may be a wire or wireless network.

Hardware Configuration of MFP

Figure 2:
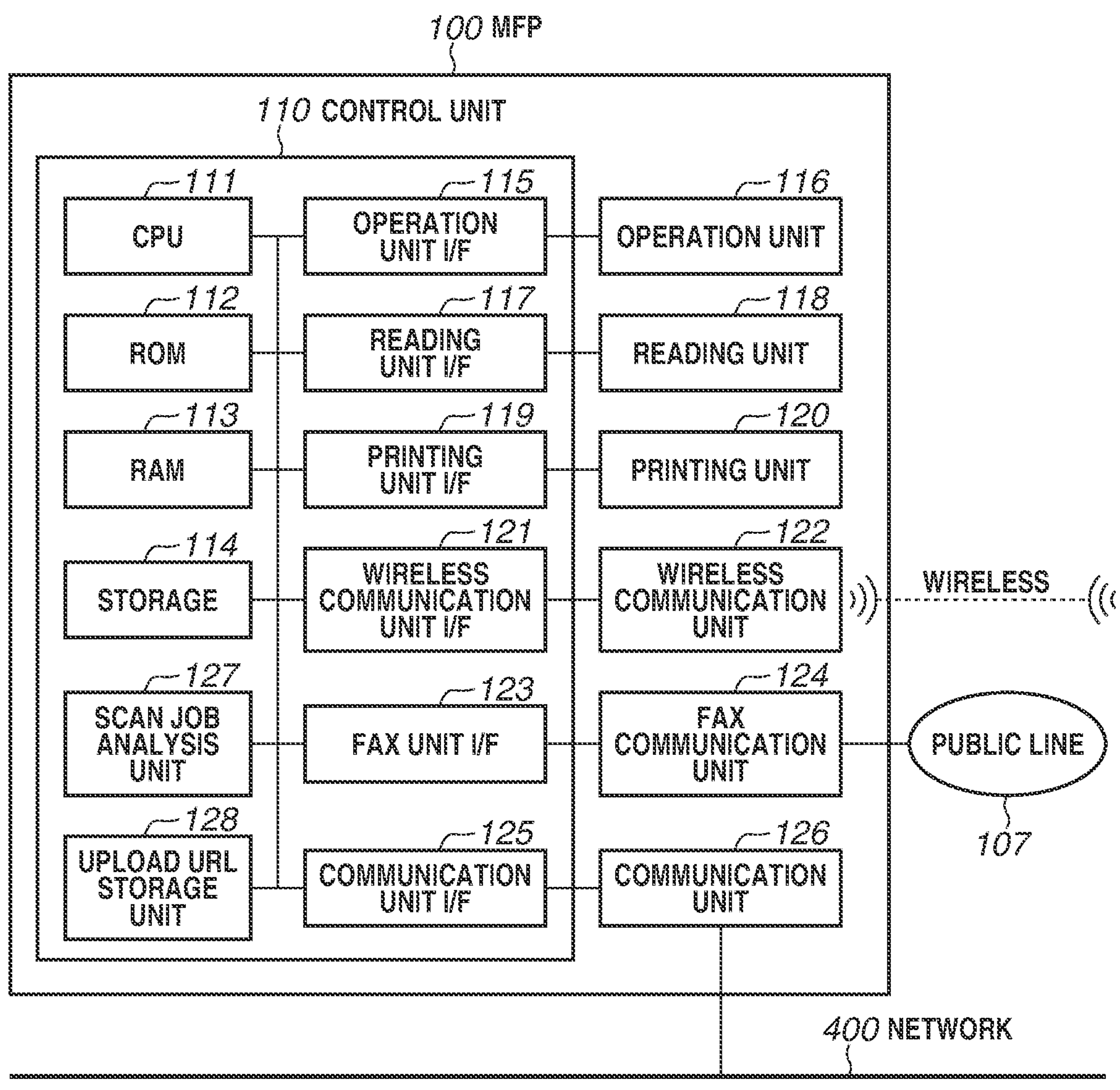
FIG. 2 is a block diagram illustrating a hardware configuration of a multi-function peripheral (MFP).

FIG. 2 illustrates an example of a hardware configuration of the MFP 100. The MFP 100 includes a central processing unit (CPU) 111, a read-only memory (ROM) 112, a random-access memory (RAM) 113, a storage 114, an operation unit interface (I/F) 115, an operation unit 116, a reading unit I/F 117, a reading unit 118, a printing unit I/F 119, a printing unit 120, a wireless communication unit I/F 121, and a wireless communication unit 122. The MFP 100 further includes a FAX unit I/F 123, a FAX communication unit 124, a communication unit I/F 125, a communication unit 126, a scan job analysis unit 127, and an upload Uniform Resource Locator (URL) storage unit 128.

A control unit 110 including the CPU 111 controls the overall operation of the MFP 100.

The CPU 111 loads control programs stored in the ROM 112 or the storage 114 into the RAM 113 to perform read control, print control, and other various types of control.

The ROM 112 stores control programs that can be executed by the CPU 111. The ROM 112 also stores a boot programs and font data.

The RAM 113 is the main memory used as a work area, and a temporary storage area for loading various control programs stored in the ROM 112 and the storage 114.

The storage 114 stores image data, print data, various programs, and various setting information. Although the present exemplary embodiment is premised on the use of a flash memory as the storage 114, auxiliary storage devices, such as a solid-state drive (SDD) and a hard disc drive (HDD), as well as an embedded Multi Media Card (eMMC), are also applicable.

In the MFP 100 according to the present exemplary embodiment, one CPU (CPU 111) executes the processing illustrated in flowcharts (described below) by using one memory (RAM 113). However, the present disclosure is not so limited. For example, a plurality of CPUs, RAMs, ROMs, and storages may be operated in a collaborative way to perform the pieces of processing in the flowcharts (described below). The processing may be partly executed by using hardware circuitry, such as an application specific integrated circuit (ASIC) and a field programmable gate array (FPGA).

The operation unit I/F 115 connects between the operation unit 116 (including a display unit, such as a touch panel, and hardware keys) and the control unit 110.

The operation unit 116 displays information to the user and detects inputs from the user.

The reading unit I/F 117 connects between the reading unit 118, such as a scanner, and the control unit 110.

When the reading unit 118 reads a document image, the CPU 111 converts the image into image data, such as binary data. The image data generated based on the image read by the reading unit 118 is transmitted to an external apparatus or printed on a recording sheet. The reading unit 118 is provided with an automatic document feeder (ADF) that feeds a document placed on its document tray on the MFP 100 and reads the image of the fed document to generate image data.

The printing unit I/F 119 connects between the printing unit 120, such as a printer, and the control unit 110. The CPU 111 transfers image data (print data) stored in the RAM 113 to the printing unit 120 via the printing unit I/F 119.

The printing unit 120 prints an image based on transferred image data on a recording sheet fed from a feed cassette.

The wireless communication unit I/F 121, an interface for controlling the wireless communication unit 122, can wirelessly connect between the control unit 110 and an external wireless device.

The control unit 110 controls the FAX communication unit 124, such as a facsimile machine, via the FAX unit I/F 123 to connect to a public line 107.

The FAX unit I/F 123, an interface for controlling the FAX communication unit 124, controls a modem and a network control unit (NCU) for facsimile communication to enable connecting to the public line 107 and controlling a facsimile communication protocol.

The communication unit I/F 125 connects between the control unit 110 and the network 400. The communication unit I/F 125 enables the communication unit 126 to transmit image data and various pieces of in-apparatus information to an external apparatus on the network 400, and receive print data and information on the network 400 from an information processing apparatus on the network 400. Examples of possible communications via the network 400 include communication by e-mail and file transmission using other protocols, such as File Transfer Protocol (FTP), Server Message Block (SMB), and Web Distributed Authoring and Versioning (WEBDAV). Examples of possible communications further include communication of scan jobs and various types of setting data via the network 400 through a HyperText Transfer Protocol (HTTP) communication access from the cloud scan service 200. The CPU 111 receives scan jobs from the cloud scan service 200 connected via the network 400, and analyzes the scan jobs via the scan job analysis unit 127. The upload URL storage unit 128 stores upload URLs used to upload the read image data included in the analysis results to the cloud scan service 200.

Other scan parameters (original type: document, read size: A4) are stored in the work area of the RAM 113.

Overall Configuration of Cloud Scan Service

Figure 3:
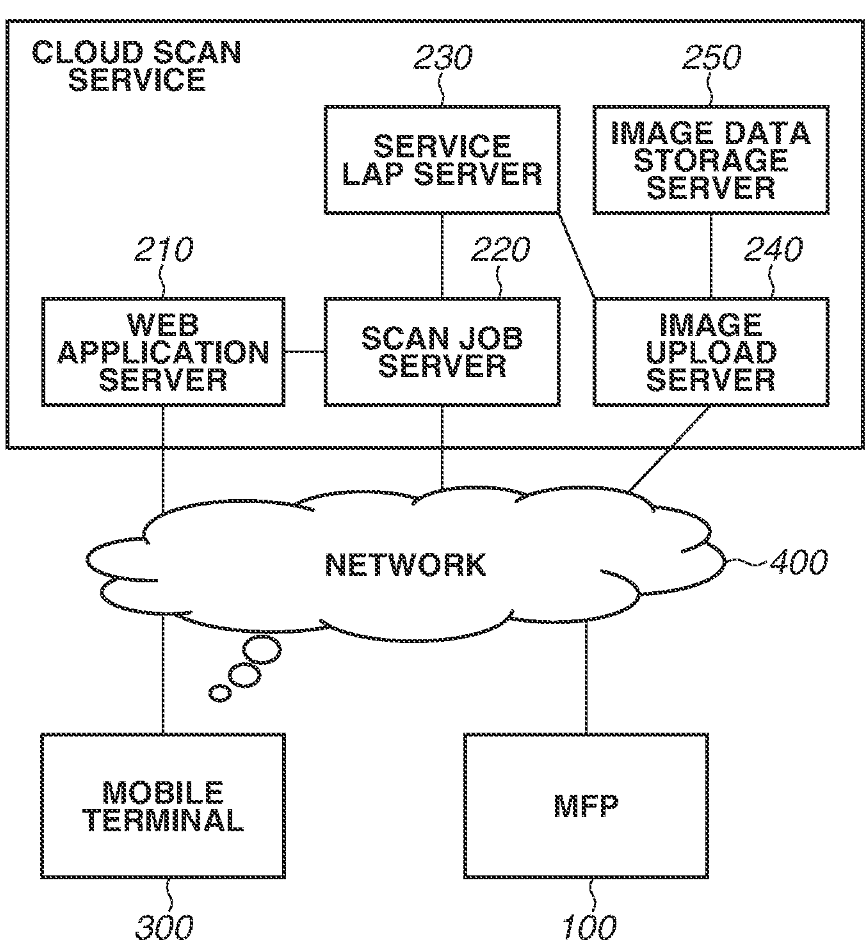
FIG. 3 is a block diagram illustrating an overall configuration of a cloud scan service.

FIG. 3 illustrates an example of a configuration of the cloud scan service 200.

The cloud scan service 200 includes a web application server 210, a scan job server 220, a service lap server 230, an image upload server 240, and an image data storage server 250.

The web application server 210 transmits data (e.g., HTML) for displaying an operation screen (e.g., a reading start screen 1301) of the cloud scan service 200 on the mobile terminal 300 to respond to an input by a user operation on the mobile terminal 300.

The scan job server 220 controls the entire cloud scan service 200 in collaboration with the web application server 210 and the service lap server 230.

The service lap server 230 performs processing for generalizing the processing of the image upload server 240 and generalizing the communication with the MFP 100.

The image upload server 240 performs processing dedicated for image data uploading, controls the order of image data subjected to division uploading, and combines divided pieces of image data.

The image data storage server 250 stores the image data combined by the image upload server 240.

Hardware Configuration of Web Application Server

Figure 4:
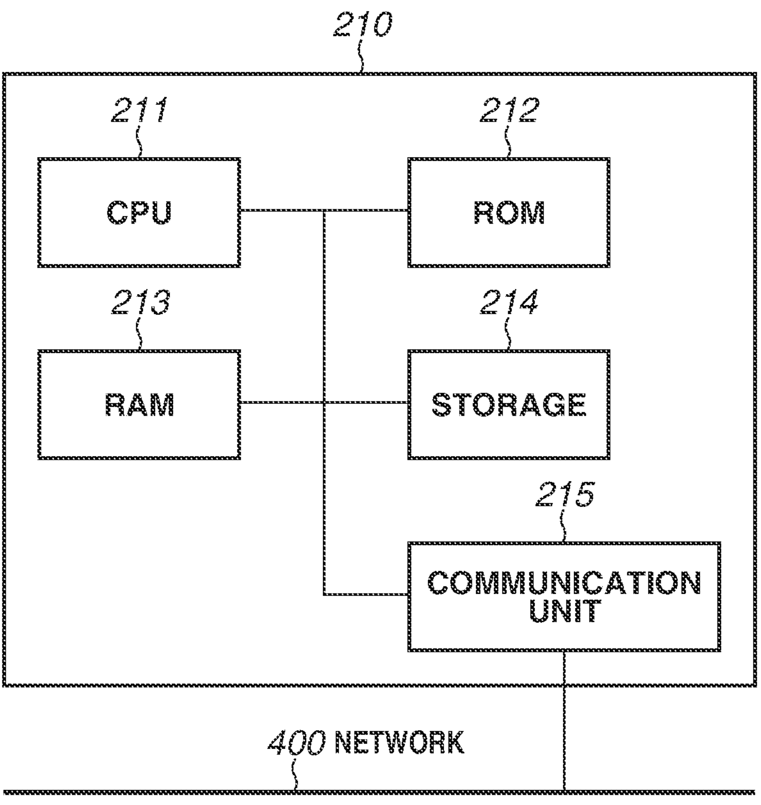
FIG. 4 is a block diagram illustrating a hardware configuration of each application server.

FIG. 4 illustrates an example of a hardware configuration of the web application server 210. The web application server 210 includes a CPU 211, a ROM 212, a RAM 213, a storage 214, and a communication unit 215.

The CPU 211 reads control programs stored in the ROM 212 or the storage 214 into the RAM 213 and performs read control, print control, and other various types of control.

The ROM 212 stores control programs that can be executed by the CPU 211. The ROM 212 also stores a boot program.

The RAM 213 is the main memory used as a work area, and a temporary storage area for loading various control programs stored in the ROM 212 and the storage 214.

The storage 214 stores image data, various programs, and various setting information. Although the present exemplary embodiment is premised on the use of a flash memory as the storage 214, auxiliary storage devices, such as an SDD and an HDD, as well as an eMMC, are also applicable.

The communication unit 215 is connected with the network 400 and controlled by the CPU 211 to communicate with the mobile terminal 300 and other connected servers.

The scan job server 220, the service lap server 230, the image upload server 240, and the image data storage server 250 each have a similar hardware configuration to the web application server 210 in FIG. 4, and redundant descriptions thereof will be omitted. Each of these servers may be configured as a virtual server that operates inside the same single hardware configuration.

Sequence of Image Read Processing

Figure 5:
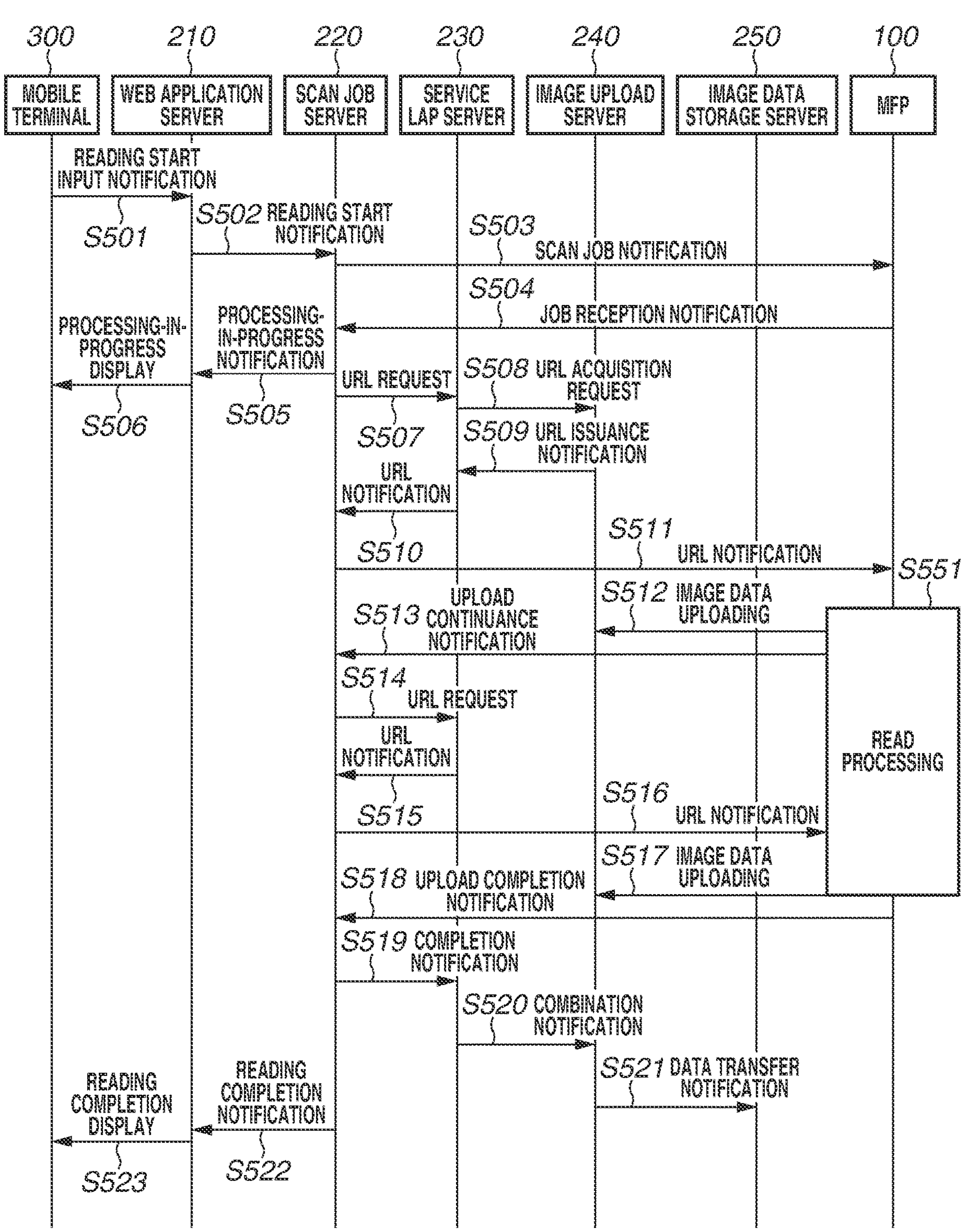
FIG. 5 is a sequence diagram illustrating image read processing.

FIG. 5 is a sequence diagram illustrating image read processing performed by the cloud scan service 200, the MFP 100, and the mobile terminal 300 via the network 400. In the following descriptions, each step number of the sequence is described with "S" in front of each number.

In step S501, when the user presses a "Start Reading" button 1303 displayed on the screen 1301 in FIG. 13A, the mobile terminal 300 transmits a reading start input notification to the web application server 210.

Upon reception of the reading start input notification, then in step S502, the web application server 210 transmits a reading start notification to the scan job server 220. The reading start notification includes scan parameters as information for read processing execution. The scan parameters include a scan parameter 1302 indicating the original type, read size, and data format. The scan parameter 1302 includes user settings displayed on the screen of the mobile terminal 300.

Upon reception of the reading start notification, then in step S503, the scan job server 220 transmits a scan job notification to the MFP 100. The scan job notification includes scan parameters as information for performing the read processing.

Upon reception of the scan job notification and the scan parameters as information for performing the read processing, the MFP 100 determines whether the scan job execution is possible.

If the MFP 100 determines that the scan job execution is possible, then in step S504, the MFP 100 transmits a job reception notification to the scan job server 220.

This sequence will be described below centering on a case where the scan job execution is possible. A case where the scan job execution is impossible will be described below with reference to FIG. 15.

Upon reception of the job reception notification, then in step S505, the scan job server 220 transmits a processing-in-progress notification to the web application server 210 to indicate that a job has been received and is being processed on the screen of the mobile terminal 300.

Upon reception of the processing-in-progress notification (S505), then in step S506, the web application server 210 transmits a processing-in-progress display to the mobile terminal 300. Upon reception of the processing-in-progress display, the mobile terminal 300 updates the screen display to the screen indicating that a scan job is being processed. For example, a screen 1304 (FIG. 13B) is displayed.

After transmitting the processing-in-progress notification (S505), then in step S507, the scan job server 220 transmits a URL request to the service lap server 230 to notify the MFP 100 of an image data transmission destination.

Figure 14:
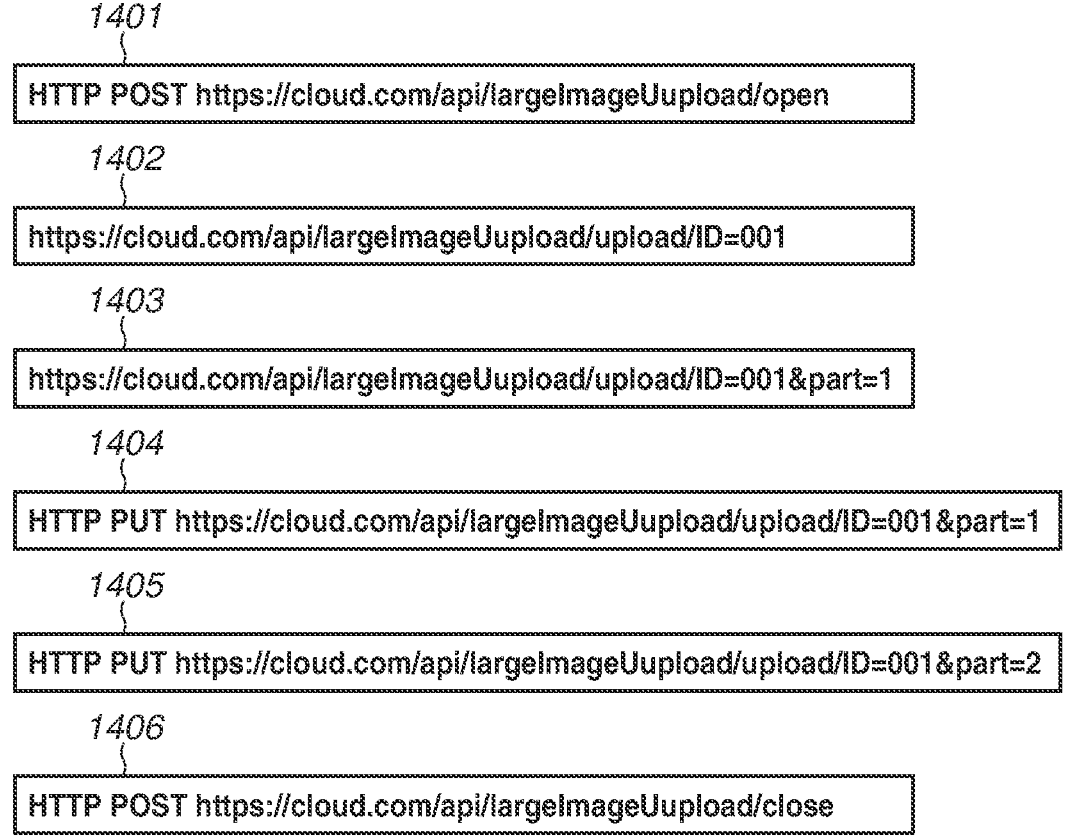
FIG. 14 illustrates examples of HyperText Transfer Protocol (HTTP) communications and Uniform Resource Locators (URLs).

Upon reception of the URL request, then in step S508, the service lap server 230 transmits a URL acquisition request to the image upload server 240. A HTTP communication 1401 in FIG. 14 is an example of the URL acquisition request.

Upon reception of the URL acquisition request, then in step S509, the image upload server 240 issues a URL for uploading the image data via an upload service and transmits a URL issuance notification for the issued URL to the service lap server 230. A URL 1402 in FIG. 14 is an example of a URL transmitted by the image upload server 240.

Upon reception of the URL issuance notification for the URL issued in step S509, then in step S510, the service lap server 230 transmits a URL notification and an upload URL supplied with upload count information for the scan job for the received URL, to the scan job server 220. A URL 1403 in FIG. 14 is an example of the upload URL supplied with the upload count information “part=1” indicating the first uploading.

Upon reception of the URL notification and the upload URL, the in step S511, the scan job server 220 transmits a URL notification and the received upload URL to the MFP 100.

Upon reception of the URL notification and the upload URL, then in step S551, the MFP 100 completes read processing preparation and starts the read processing.

When the image data to be uploaded is acquired and the amount thereof reaches a predetermined data size acquired during execution of the read processing, then in step S512, the MFP 100 uploads the image data to the image upload server 240 based on the upload URL. A HTTP communication 1404 in FIG. 14 is an example of this HTTP communication.

If the read processing is continuing even after completion of the image data uploading, then in step S513, the MFP 100 transmits an upload continuance notification to the scan job server 220.

Upon reception of the upload continuance notification, then in step S514, the scan job server 220 transmits a URL request to the service lap server 230 to request it for the URL.

Upon reception of the URL request, then in step S515, the service lap server 230 transmits an upload URL together with a URL notification to the scan job server 220. This upload URL is the second upload URL with the upload count incremented to 2 (“part=2”).

Upon reception of the URL notification and the upload URL, then in step S516, the scan job server 220 transmits a URL notification and the received upload URL to the MFP 100.

Upon reception of the URL notification and the upload URL, then in step S551, the MFP 100 continues the read processing until the next upload timing. The present exemplary embodiment will be described below centering on a case where the read processing is completed when the amount of the image data to be uploaded is less than the upload data size.

In step S517, the MFP 100 uploads, as upload data, the image data ranging from the data next to the last uploaded data to the end of the image data to the image upload server 240. A HTTP communication 1405 in FIG. 14 is an example of the HTTP communication for the second data uploading.

When the uploading is completed, then in step S518, the MFP 100 transmits an upload completion notification to the scan job server 220.

Upon reception of the upload completion notification, then in step S519, the scan job server 220 transmits a completion notification to the service lap server 230.

Upon reception of the completion notification, then in step S520, the service lap server 230 transmits a combination notification to the image upload server 240. A HTTP communication 1406 in FIG. 14 is an example of the combination notification.

Upon reception of the combination notification, the image upload server 240 combines the uploaded image data based on the information specified by “part=” to generate one image data file.

In step S521, the image upload server 240 transfers the generated image data to the image data storage server 250. The image data storage server 250 stores the image data transferred from the image upload server 240 in step S521.

Upon reception of the upload completion notification, then in step S522, the scan job server 220 transmits a reading completion notification to the web application server 210.

Upon reception of the reading completion notification, then in step S523, the web application server 210 transmits a reading completion display to the mobile terminal 300.

Upon reception of the reading completion display, the mobile terminal 300 updates the screen display to display the reading completion. A reading completion display screen 1305 in FIG. 13C is an example of the screen display.

(Processing in Mobile Terminal)

Figure 6:
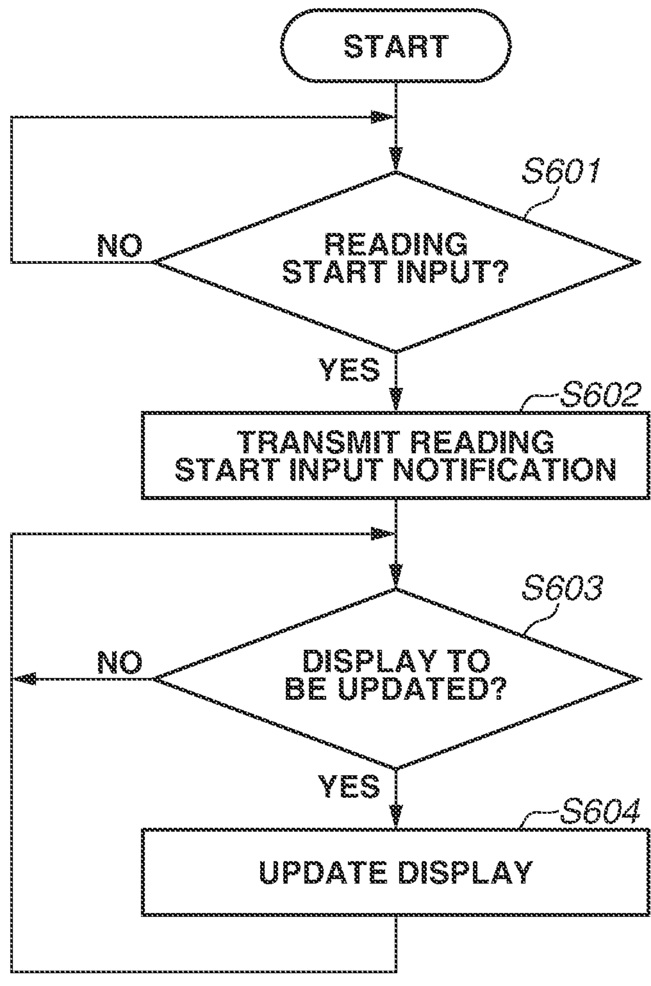
FIG. 6 is a flowchart illustrating processing of a mobile terminal.

FIG. 6 is a flowchart illustrating the processing when the mobile terminal 300 operates as the cloud scan system according to the present exemplary embodiment. The processing of this flowchart is carried out when the CPU of the mobile terminal 300 loads a program stored in the ROM or storage into the RAM and executes the program. This processing is started when the application of the cloud scan system is activated.

In step S601, the mobile terminal 300 displays a reading start screen 1301 (FIG. 13A) and waits until the user presses the [Start Reading] button 1303. If the [Start Reading] button 1303 is pressed (YES in step S601), the processing proceeds to step S602.

In step S602, the mobile terminal 300 transmits a reading start input notification to the web application server 210.

In step S603, the mobile terminal 300 waits for a display update notification from the web application server 210. If the mobile terminal 300 receives the processing-in-progress display (S506), the reading completion display 1305 (S523), and an impossibility display (S1503) from the web application server 210 (YES in step S603), the processing proceeds to step S604.

In step S604, the mobile terminal 300 updates the processing-in-progress display screen 1304, the reading completion display screen 1305, and an impossible scan job screen 1307 illustrated in FIGS. 13B, 13C, and 13D, respectively. Then, the processing returns to step S603. In step S603, the mobile terminal 300 waits for a display update notification from the web application server 210.

Processing in Web Application Server

Figure 7:
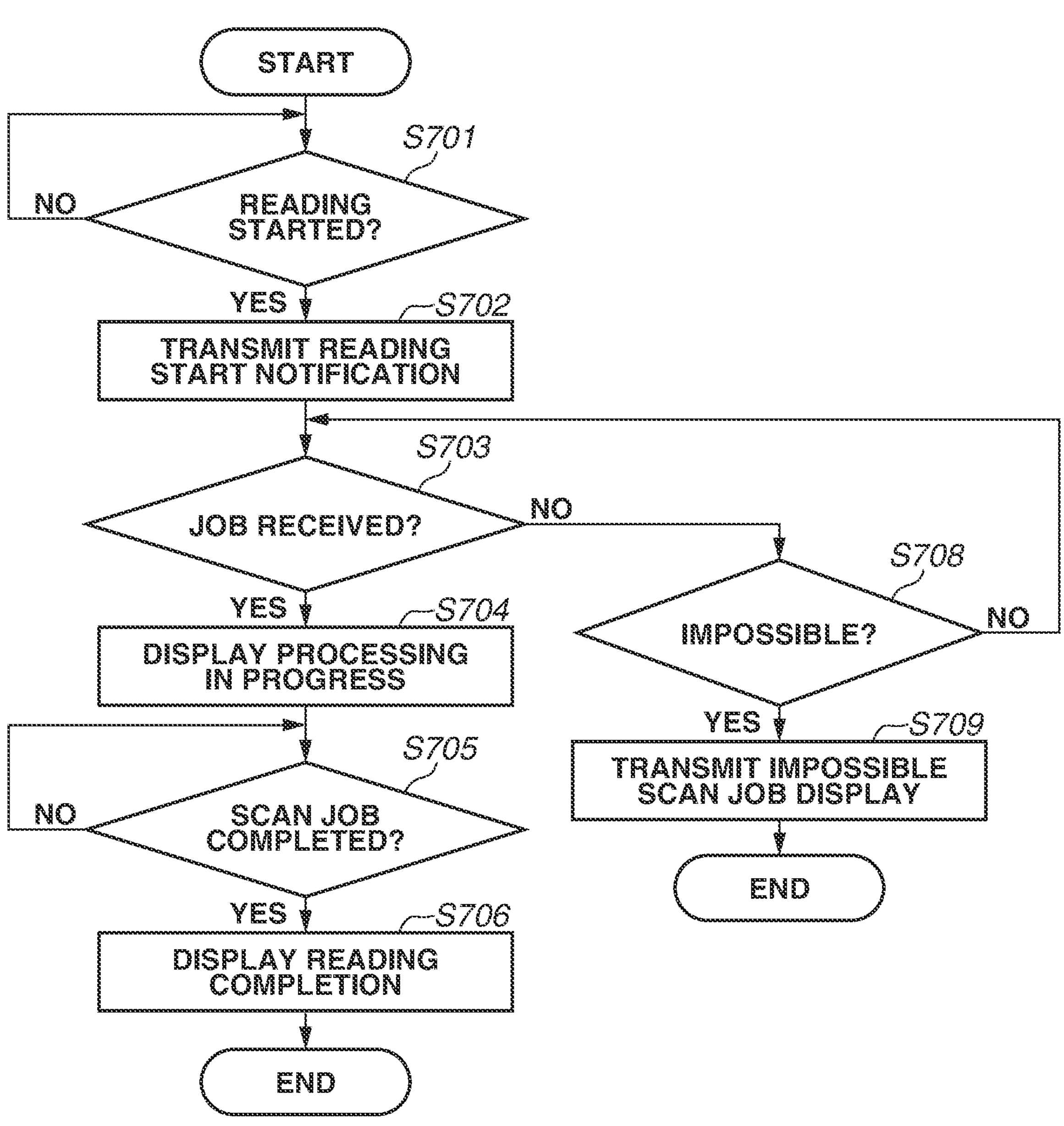
FIG. 7 is a flowchart illustrating processing of a web application server.

FIG. 7 is a flowchart illustrating processing from when the web application server 210, one of the servers included in the cloud scan service 200 according to the present exemplary embodiment, receives a reading start input notification from the mobile terminal 300 until the MFP 100 completes the read processing. The processing of this flowchart is carried out when the CPU of the web application server 201 loads a program stored in the ROM or storage into the RAM and executes the program.

In step S701, the web application server 210 waits for the reception of the reading start input notification (S501) transmitted from the mobile terminal 300.

Upon reception of the reading start input notification, the processing proceeds to step S702. In step S702, the web application server 210 transmits the reading start notification (S502) and the scan parameters (S503) to the scan job server 220.

The scan parameters are displayed as illustrated in the scan parameter 1302 on the screen of the mobile terminal 300, and the parameter settings are stored in the web application server 210. If the user operates the mobile terminal 300 and changes any setting value in the scan parameters, the mobile terminal 300 transmits the changed scan parameter to the web application server 210 which then stores the scan parameter. In step S703, the web application server 210 waits for a job reception notification and other notifications from the scan job server 220. If the web application server 210 receives the job reception notification (YES in step S703), the processing proceeds to step S704. If the web application server 210 does not receive the relevant notification (NO in step S703), the processing proceeds to step S708.

When the web application server 210 receives the processing-in-progress notification (S505) from the scan job server 220 that has received the job reception notification in step S504 (YES in step S703), the processing proceeds to step S704. In step S704, the web application server 210 transmits the processing-in-progress display (S506) to the mobile terminal 300.

In step S705, the web application server 210 waits for the reception of the reading completion notification (S522) from the scan job server 220.

Upon reception of the reading completion notification transmitted by the scan job server 220 in step S522 (YES in step S705), the processing proceeds to step S706. In step S706, the web application server 210 transmits the reading completion display (S523) to the mobile terminal 300. Then, the processing exits from the flowchart.

On the other hand, if the web application server 210 does not receive the job reception notification from the scan job server 220 (NO in step S703), the processing proceeds to step S708.

In step S708 (when the relevant notification is received), the web application server 210 determines that the scan job execution is impossible. If the web application server 210 receives an impossibility notification in step S1502 (FIG. 15) from the scan job server 220 (YES in step S708), the processing proceeds to step S709. If the web application server 210 does not receive the relevant notification (NO in step S708), the processing returns to step S703. In step S703, the web application server 210 waits for the reception of a notification.

In step S709, the web application server 210 transmits the impossibility display (S1503) to the mobile terminal 300.

Processing in Scan Job Server

Figure 8:
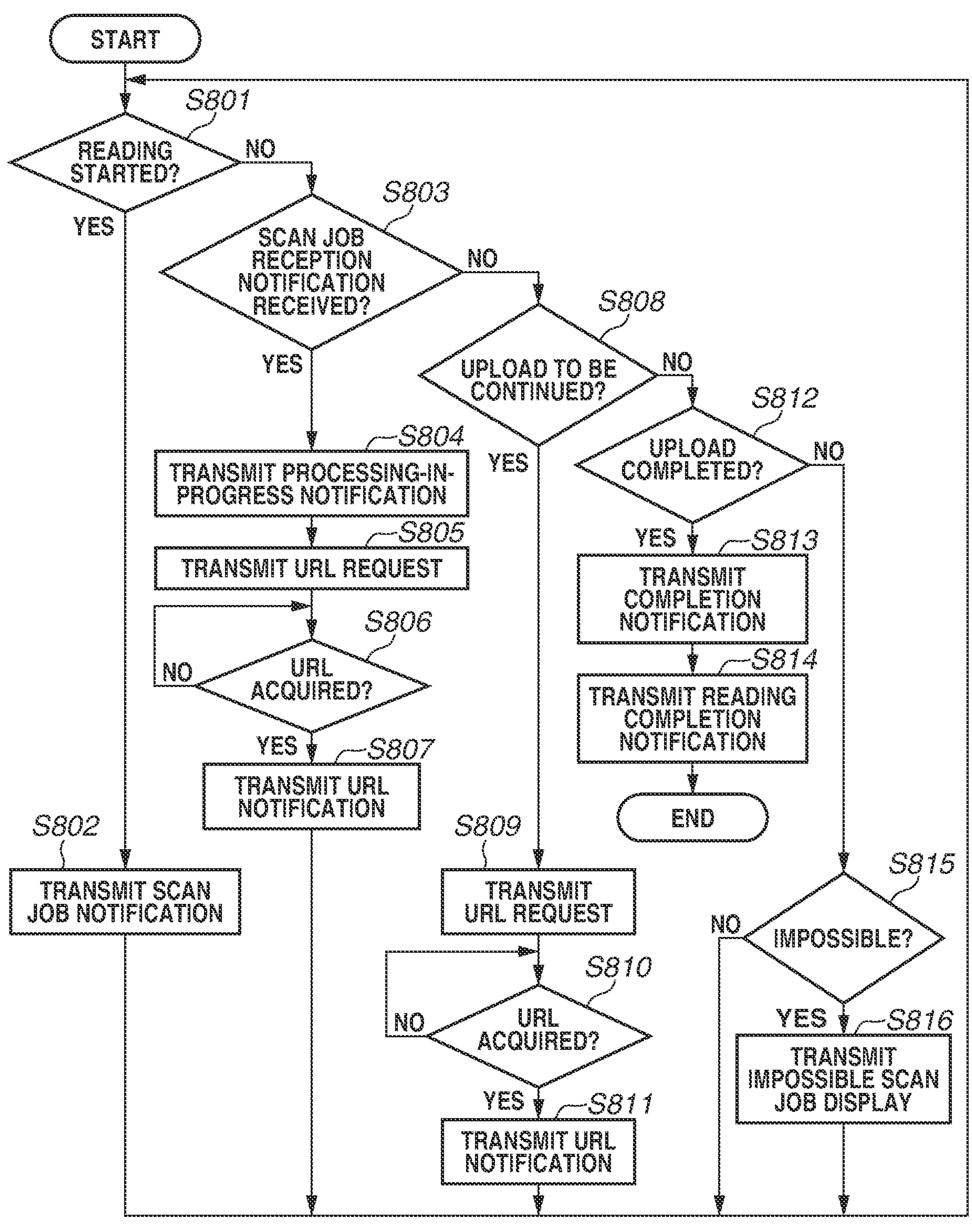
FIG. 8 is a flowchart illustrating processing of a scan job server.

FIG. 8 is a flowchart illustrating the processing of the scan job server 220, one of the servers included in the cloud scan service 200 according to the present exemplary embodiment. The processing of this flowchart is carried out when the CPU of the scan job server 220 loads a program stored in the ROM or storage into the RAM and executes the program.

In step S801, the scan job server 220 determines whether the reading start notification transmitted by the web application server 210 in step S502 is received.

If the scan job server 220 receives the reading start notification (S502) and the scan parameters (YES in step S801), the processing proceeds to step S802. If the relevant notification and parameters are not received (NO in step S801), the processing proceeds to step S803.

In step S802, the scan job server 220 transmits the scan job notification (S503) and the scan parameters to the MFP 100. Then, the processing returns to step S801. In step S801, the scan job server 220 waits for the reception of a notification.

In step S803, the scan job server 220 determines whether the job reception notification transmitted by the MFP 100 in step S504 is received. If the job reception notification is received from the MFP 100 (YES in step S803), the processing proceeds to step S804. If the relevant notification is not received (NO in step S803), the processing proceeds to step S808.

In step S804, the scan job server 220 transmits the processing-in-progress notification (S505) to the web application server 210.

In step S805, the scan job server 220 transmits the URL request (S507) to the service lap server 230. Then, the processing proceeds to step S806.

In step S806, the scan job server 220 waits for the acquisition of a URL. If the scan job server 220 receives the URL notification and the upload URL transmitted by the service lap server 230 in step S510 (YES in step S806), the processing proceeds to step S807.

In step S807, the scan job server 220 transmits the URL notification and the upload URL (S511) to the MFP 100. Then, the processing returns to step S801.

On the other hand, if the job reception notification is not received (NO in step S803), the processing proceeds to step S808. In step S808, the scan job server 220 determines whether the upload continuance notification (S513) is received from the MFP 100. If the scan job server 202 receives the upload continuance notification transmitted by the MFP 100 in step S513 (YES in step S808), the processing proceeds to step S809.

In step S809, the scan job server 220 transmits the URL request (S514) to the service lap server 230. Then, the processing proceeds to step S810.

In step S810, the scan job server 220 waits for the acquisition of a URL. If the scan job server 220 receives the URL notification and the upload URL transmitted by the service lap server 230 in step S515 (YES in step S810), the processing proceeds to step S811.

In step S811, the scan job server 220 transmits the URL notification and the upload URL (S516) to the MFP 100. Then, the processing returns to step S801.

If the scan job server 220 determines that the upload continuance notification is not received (NO in step S808), the processing proceeds to step S812. In step S812, the scan job server 220 determines whether an upload completion notification is received. If the upload completion notification (S518) is received from the MFP 100 (YES in step S812), the processing proceeds to step S813. If the relevant notification is not received (NO in step S812), the processing proceeds to step S815.

In step S813, the scan job server 220 transmits the completion notification (S519) to the service lap server 230.

In step S814, the scan job server 220 transmits the reading completion notification (S522) to the web application server 210. Then, the processing exits from the flowchart.

On the other hand, if the upload completion notification transmitted by the MFP 100 in step S518 is not received (NO in step S812), the processing proceeds to step S815. In step S815, the scan job server 220 determines whether a notification of the impossible scan job execution is received. If the scan job server 220 receives the impossible job notification transmitted by the MFP 100 in step S1501 (YES in step S815), the processing proceeds to step S816. If the relevant notification is not received (NO in step S815), the processing returns to step S801.

In step S816, the scan job server 220 transmits the impossibility notification (S1502) to the web application server 210. Then, the processing returns to step S801.

Processing in Service Lap Server

Figure 9:
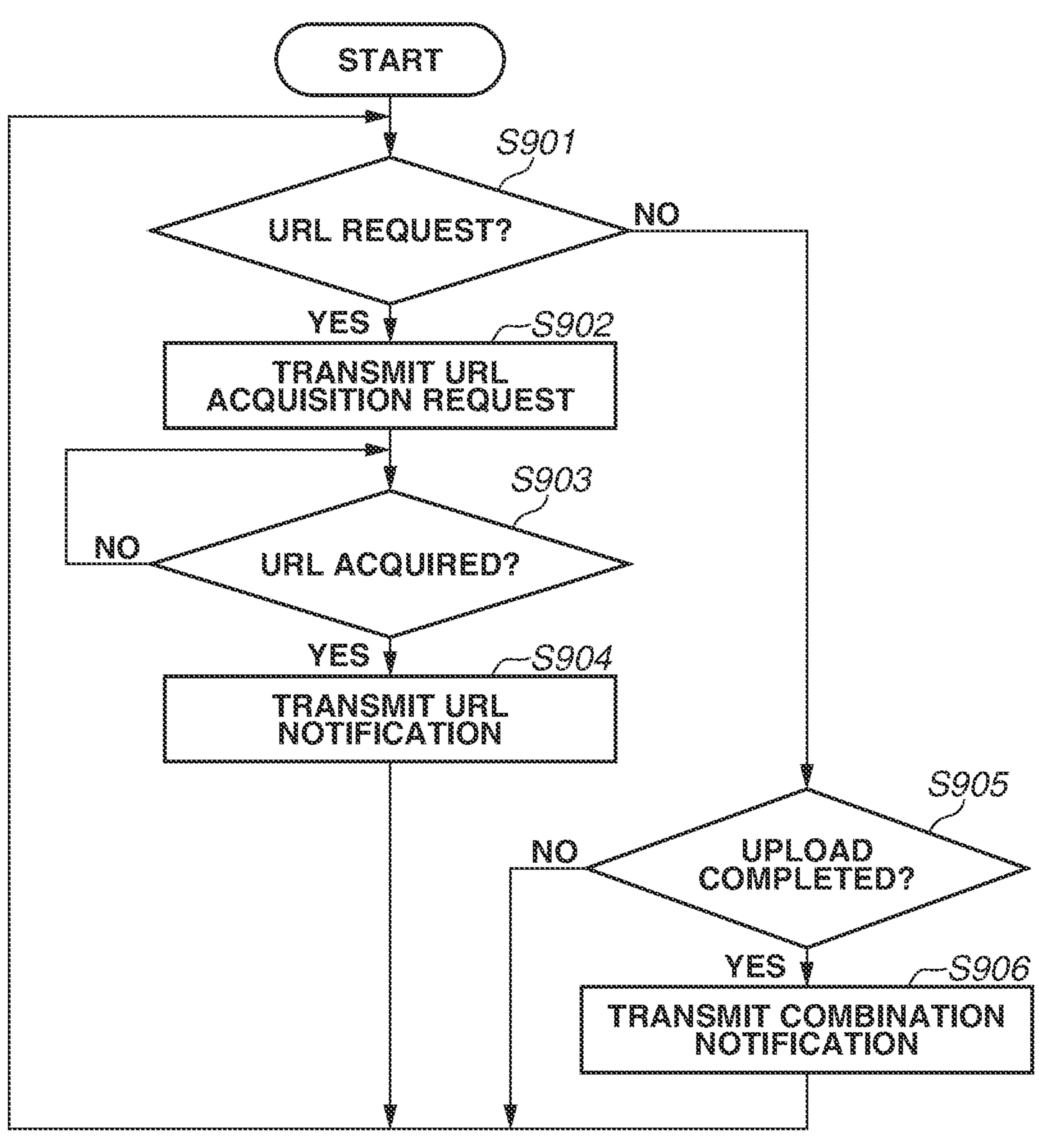
FIG. 9 is a flowchart illustrating processing of a service lap server.

FIG. 9 is a flowchart illustrating the processing of the service lap server 230, one of the servers included in the cloud scan service 200 according to the present exemplary embodiment. The processing of this flowchart is carried out when the CPU of the service lap server 230 loads a program stored in the ROM or storage into the RAM and executes the program.

In step S901, the service lap server 230 determines whether the URL request transmitted by the scan job server 220 in step S507 is received. If the service lap server 230 receives the URL request (YES in step S901), the processing proceeds to step S902. If the URL request is not received (NO in step S901), the processing proceeds to step S905.

In step S902, the service lap server 230 transmits the URL acquisition request (S508) to the image upload server 240.

In step S903, the service lap server 230 waits for the acquisition of a URL. If the service lap server 230 receives the URL issuance notification and the upload URL transmitted by the image upload server 240 in step S509 (YES in step S903), the processing proceeds to step S904.

In step S904, the service lap server 230 transmits the URL notification and the upload URL (S510) to the scan job server 220.

In step S905, the service lap server 230 determines whether the completion notification transmitted by the scan job server 220 in step S519 is received. If the service lap server 230 receives the completion notification (YES in step S905), the processing proceeds to step S906. If the relevant notification is not received (NO in step S905), the processing returns to step S901.

In step S906, the service lap server 230 transmits the combination notification (S520) to the image upload server 240 to instructs it to combine the upload data and transmit the combined image data (S521) to the image data storage server 250. Then, the processing returns to step S901.

Processing in Image Upload Server

Figure 10:
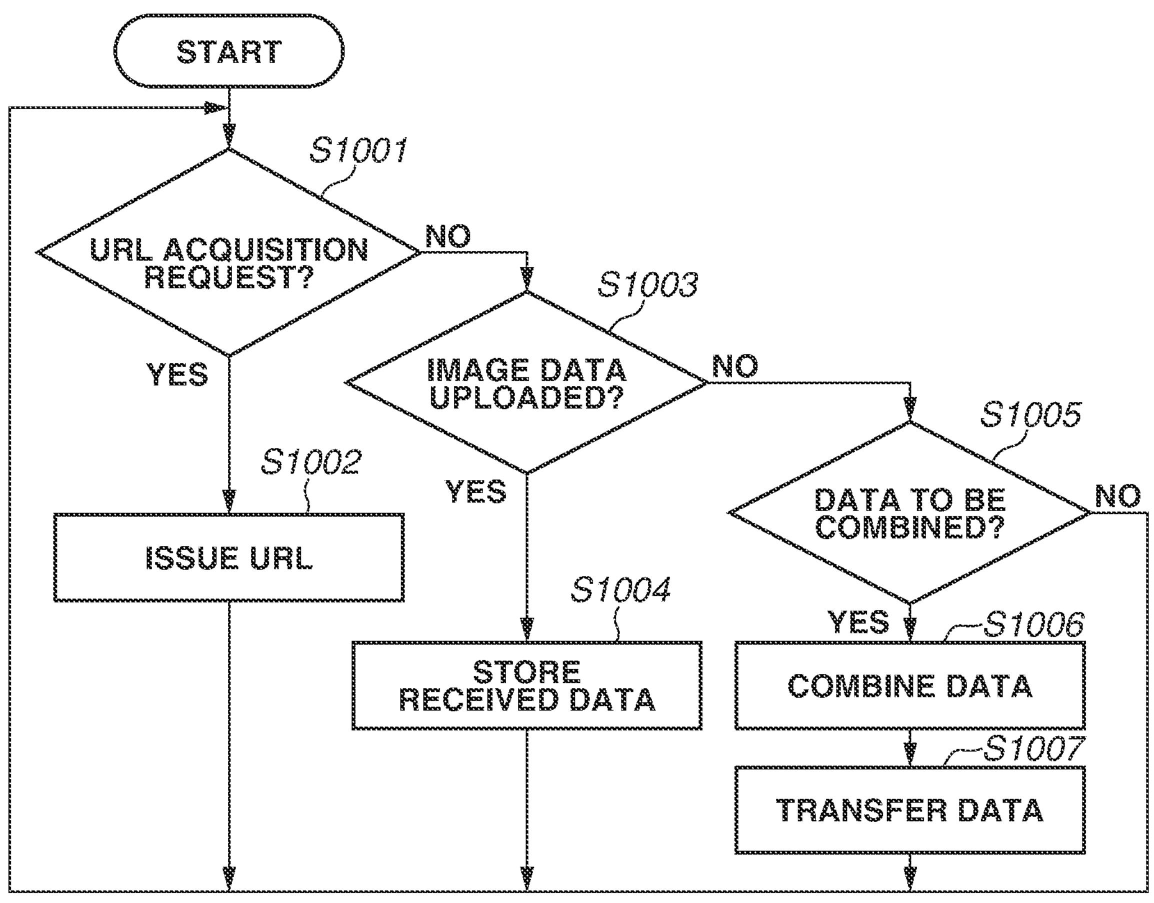
FIG. 10 is a flowchart illustrating processing of an image upload server.

FIG. 10 is a flowchart illustrating the processing of the image upload server 240, one of the servers included in the cloud scan service 200 according to the present exemplary embodiment. The processing of this flowchart is carried out when the CPU of the image upload server 240 loads a program stored in the ROM or storage into the RAM and executes the program.

In step S1001, the image upload server 240 determines whether the URL acquisition request transmitted by the service lap server 230 in step S508 is received. If the URL acquisition request is received from the service lap server 230 (YES in step S1001), the processing proceeds to step S1002. If the relevant request is not received (NO in step S1001), the processing proceeds to step S1003.

In step S1002, the image upload server 240 generates an image upload URL as preprocessing of the image uploading and transmits the URL issuance notification and the image upload URL (S509) to the service lap server 230.

On the other hand, if the URL acquisition request is not received (NO in step S1001), the processing proceeds to step S1003. In step S1003, the image upload server 240 determines whether the image data is uploaded. If the image data is uploaded (S512 or S517) from the MFP 100 (YES in step S1003), the processing proceeds to step S1004. If the image data is not uploaded (NO in step S1003), the processing proceeds to step S1005.

In step S1004, the image upload server 240 receives the image data uploaded by the MFP 100 in step S512 or S517 and stores the image data in the storage device.

In step S1005, the image upload server 240 determines whether the combination notification transmitted by the service lap server 230 in step S520 is received. If the combination notification is received from the service lap server 230 (YES in step S1005), the processing proceeds to step S1006. If the relevant notification is not received (NO in step S1006), the processing returns to step S1001. In step S1001, the image upload server 240 waits for the reception of a notification.

In step S1006, the image upload server 240 combines the image data uploaded in step S512 or S517.

In step S1007, the image upload server 240 transmits the image data combined in step S1006 (S521) together with the data transfer notification, to the image data storage server 250.

Processing in Image Data Storage Server

Figure 11:
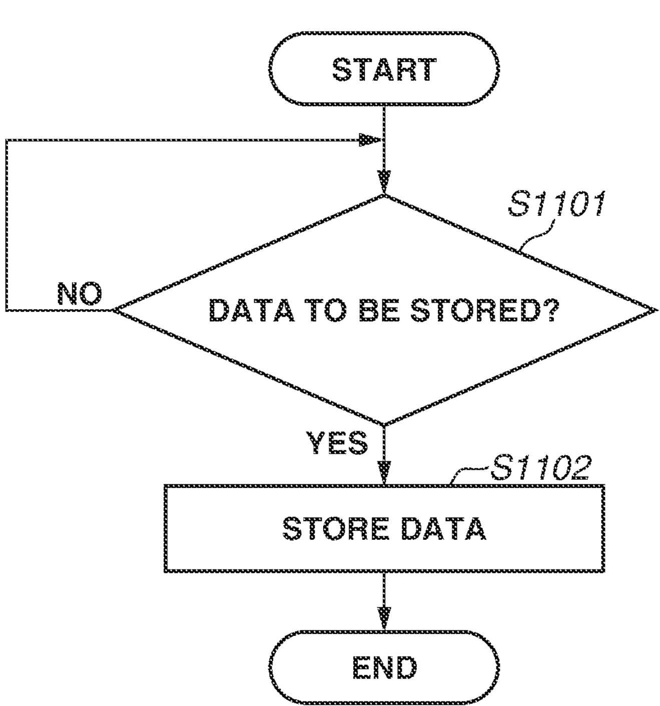
FIG. 11 is a flowchart illustrating processing of an image data storage server.

FIG. 11 is a flowchart illustrating the processing of the image data storage server 250, one of the servers included in the cloud scan service 200 according to the present exemplary embodiment. The processing of this flowchart is carried out when the CPU of the image data storage server 250 loads a program stored in the ROM or storage into the RAM and executes the program.

In step S1101, the image data storage server 250 waits for a notification as a data storage request. If the image data storage server 250 receives the data transfer notification (S521) and the image data from the image upload server 240 (YES in step S1101), the processing proceeds to step S1102. In step S1102, the image data storage server 250 stores the received image data. Then, the processing exits from the flowchart.

Processing in MFP

Figure 12:
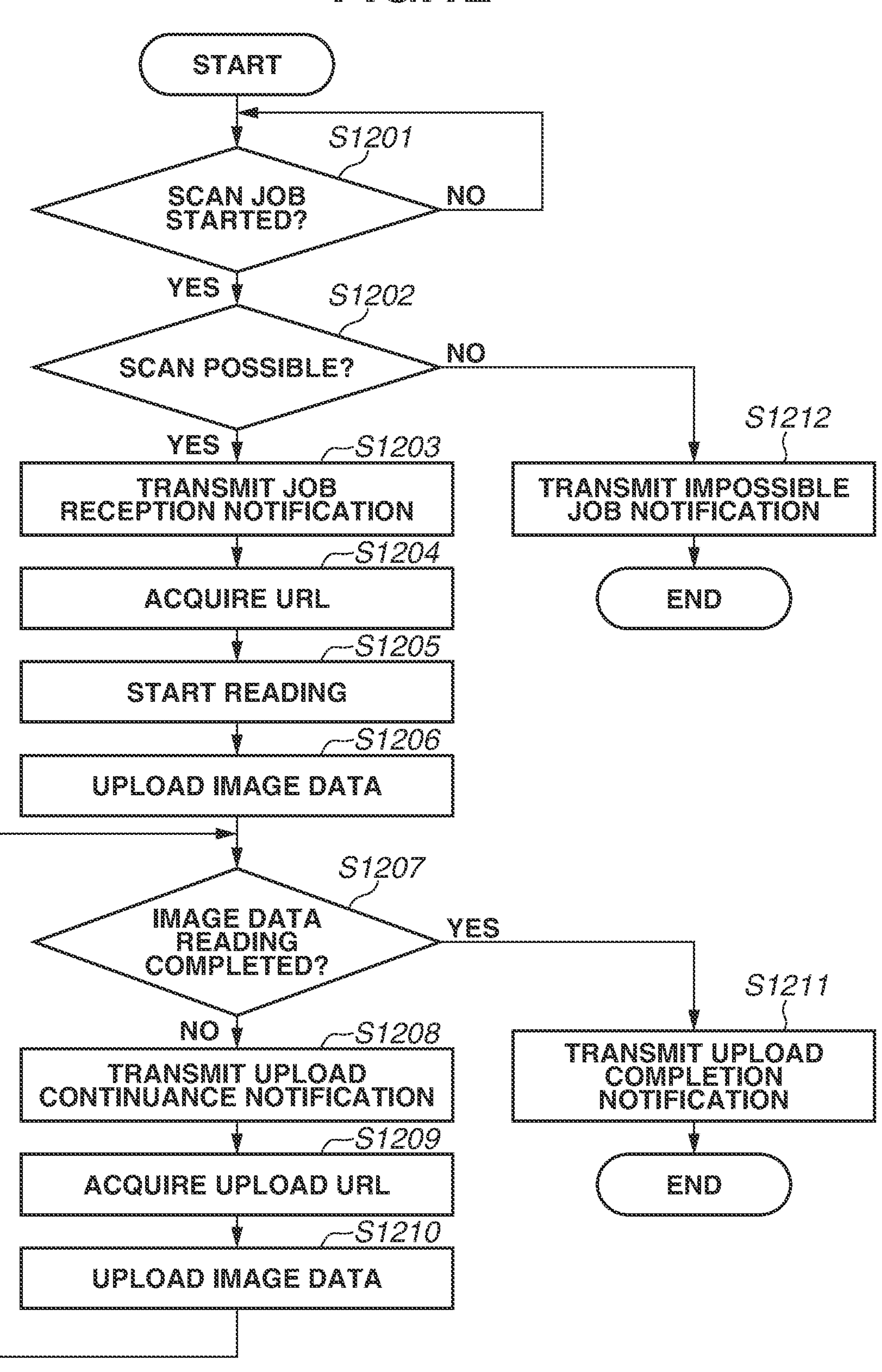
FIG. 12 is a flowchart illustrating processing of the MFP.

FIG. 12 is a flowchart illustrating the processing of the MFP 100 operating as the cloud scan system according to the present exemplary embodiment. The processing of this flowchart is carried out when the CPU of the MFP 100 loads a program stored in the ROM or storage into the RAM and executes the program.

In step S1201, the MFP 100 waits for a scan job start notification. If the MFP 100 receives the scan job notification and the scan parameters transmitted by the scan job server 220 in step S503 (YES in step 1201), the processing proceeds to step S1202.

In step S1202, the MFP 100 determines whether the scan job execution is possible based on the received scan parameters of the scan job and the job execution status of the MFP 100. Examples of conditions for determining that the scan job execution is possible include whether other processing involving the read processing, such as coy processing, is being performed. If the scan job execution is possible (YES in step S1202), the processing proceeds to step S1203. When the scan job execution is impossible (NO in step S1202), the processing proceeds to step S1212.

In step S1203, the MFP 100 transmits the job reception notification (S504) to the scan job server 220.

In step S1204, the MFP 100 receives the URL notification and the upload URL transmitted as return values by the scan job server 220 in step S511 in response to the job reception notification transmitted in step S504.

In step S1205, the MFP 100 starts the read processing (S551) by using the scan parameters transmitted together with the scan job notification by the scan job server 220 in step S503.

In step S1206, the MFP 100 accumulates the image data acquired as a result of the read processing and, when the amount of the image data reaches the upload data size, uploads the image data (S512) to the image upload server 240 based on the received upload URL.

In step S1207, the MFP 100 determines whether the read processing (S551) for the image data under scan read is completed. If the image data read processing is in progress (NO in step S1207), the processing proceeds to step S1208. When the read processing is completed (YES in step S1207), the processing proceeds to step S1211.

At the time of the image data uploading (S512) in FIG. 5, the read processing (S551) is continuing (NO in step S1207), and the processing proceeds to step S1208.

In step S1208, the MFP 100 transmits the upload continuance notification (S513) to the scan job server 220.

In step S1209, the MFP 100 receives the URL notification transmitted by the scan job server 220 in step S516.

In step S1210, the MFP 100 uploads the image data (S517). Then, the processing proceeds to step S1207.

If the MFP 100 determines that the read processing is completed at the timing of the image data uploading (S517) (YES in step S1207), the processing proceeds to step S1211. In step S1211, the MFP 100 transmits the upload completion notification (S518) to the scan job server 220. Then, the processing exits from the flowchart.

If the scan job execution is impossible (NO in step S1202), the processing proceeds to step S1212. In step S1212, the MFP 100 transmits the impossible job notification to the scan job server 220 (S1501). Then, the processing exits from the flowchart.

(Display Screen of Mobile Terminal)

FIGS. 13A to 13D illustrate examples of screens displayed on the screen of the mobile terminal 300.

A reading start screen 1301 in FIG. 13A displays a scan parameter 1302 and the [Start Reading] button 1303. When the user presses the [Start Reading] button 1303, the mobile terminal 300 transmits a reading start input notification to the web application server 210. The scan parameter 1302 includes the original type, read size, and output data format, such as Portable Description Format (PDF), as parameters of the document to be scanned. However, scan parameters are not limited thereto.

FIG. 13B illustrates an example of the processing-in-progress screen 1304 for notifying that the processing is continuing, transmitted from the web application server 210.

FIG. 13C illustrates a reading completion screen 1305 for notifying that the read processing is completed. This screen includes an [OK] button 1306 to be pressed by the user to notify the mobile terminal 300 that the user has confirmed the displayed contents.

FIG. 13D illustrates an example of the impossible scan job screen 1307 transmitted from the web application server 210 to the mobile terminal 300. The web application server 210 transmits this screen to the mobile terminal 300 in response to when the MFP 100 transmits a notification of the impossible scan job execution to the web application server 210 via the scan job server 220 in step S1212.

(HTTP Communication and URL)

FIG. 14 illustrates examples of HTTP communications and URLs.

The HTTP communication 1401 is an example of a URL acquisition request. The URL 1402 is an example of the URL transmitted by the image upload server 240. The URL 1403 is an example of the upload URL supplied with the upload count information. The HTTP communication 1404 is an example of the image data uploading (S512) performed by the MFP 100 based on the upload URL. The HTTP communication 1405 is an example of HTTP communication for the second data uploading. The HTTP communication 1406 is an example of the combination notification (S520).

Sequence of (Impossible) Image Read Processing

Figure 15:
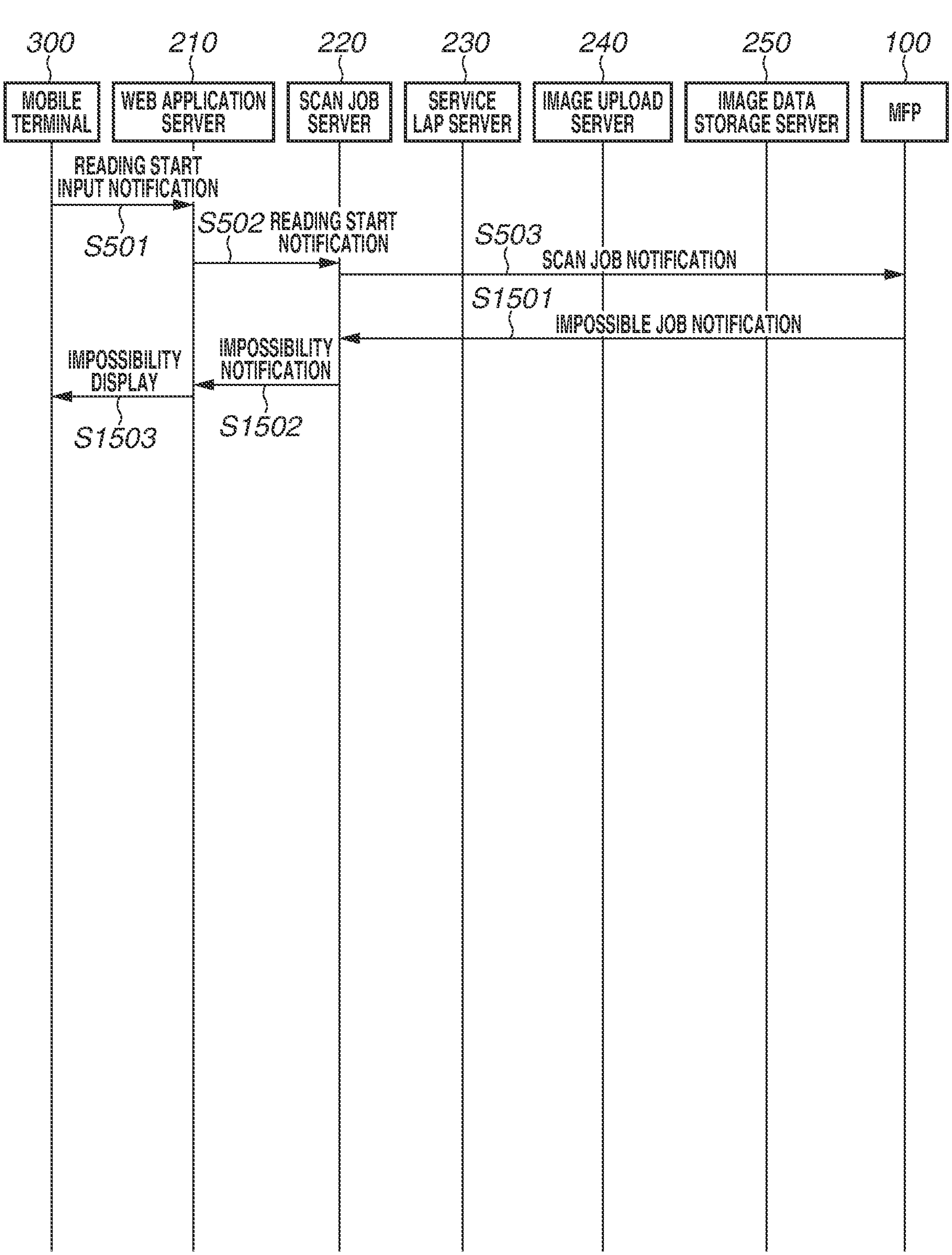
FIG. 15 is a sequence diagram illustrating processing with impossible scan job execution.

FIG. 15 is a sequence diagram when the MFP 100 determines that the image read processing is impossible. Steps S501, S502, and S503 ranging from the mobile terminal 300 to the MFP 100 are the same as those in FIG. 5, and redundant descriptions thereof will be omitted.

When the MFP 100 determines that the image read processing is impossible, then in step S1501, the MFP 100 transmits the impossible job notification to the scan job server 220.

Upon reception of the impossible job notification transmitted by the MFP 100 in step S1501, then in step S1502, the scan job server 220 transmits the impossibility notification to the web application server 210.

Upon reception of the impossibility notification transmitted by the scan job server 220 in step S1502, then in step S1503, the web application server 210 transmits the impossibility display, and the mobile terminal 300 displays the impossible scan job screen 1307.

As described above in the exemplary embodiment, in the present disclosure, image data generated by reading a document is divided into fixed-length blocks and the data is transferred to the image upload server 240. This enables using fixed-length data communication for HTTP communication processing used for image data uploading, providing simplified processing of the servers involving the data transfer. The processing load of the servers involving the image data transfer in a network image reading system can be expected to be reduced.

In the present disclosure, a URL is acquired as information for image data upload communication to the image upload server 240 via the service lap server 230, enabling data transfer communication between the image upload server 240 and a reading apparatus based on general HTTP communication. This enables changing the image upload server 240 to other services having the same purpose. This eliminates the need for processing of the reading apparatus corresponding to the update processing of the image upload server 240, providing an effect that devices supporting the image upload service can be implemented at one time without updating the firmware of the installed reading apparatus.

In the present disclosure, a URL is also acquired as information for image data upload communication to the image upload server 240 via the service lap server 230. This provides an effect that a different URL can be used for each upload operation, enabling a retrial operation in case of a communication failure.

In the present disclosure, a URL is also acquired for each transmission block as information for image data upload communication to the image upload server 240 via the service lap server 230. Thus, even if image data reaches the image upload server 240 in reverse order of transmission because of the communication path, the information included in the URL enables the image upload server 240 to combine the transmitted data in correct order.

A second exemplary embodiment will be described. According to the first exemplary embodiment, when the MFP 100 continues the image read processing, the service lap server 230 issues the next URL. The second exemplary embodiment will be described centering on a case where the service lap server 230 issues a URL acquisition request to the image upload server 240 for each upload operation.

Figure 16:
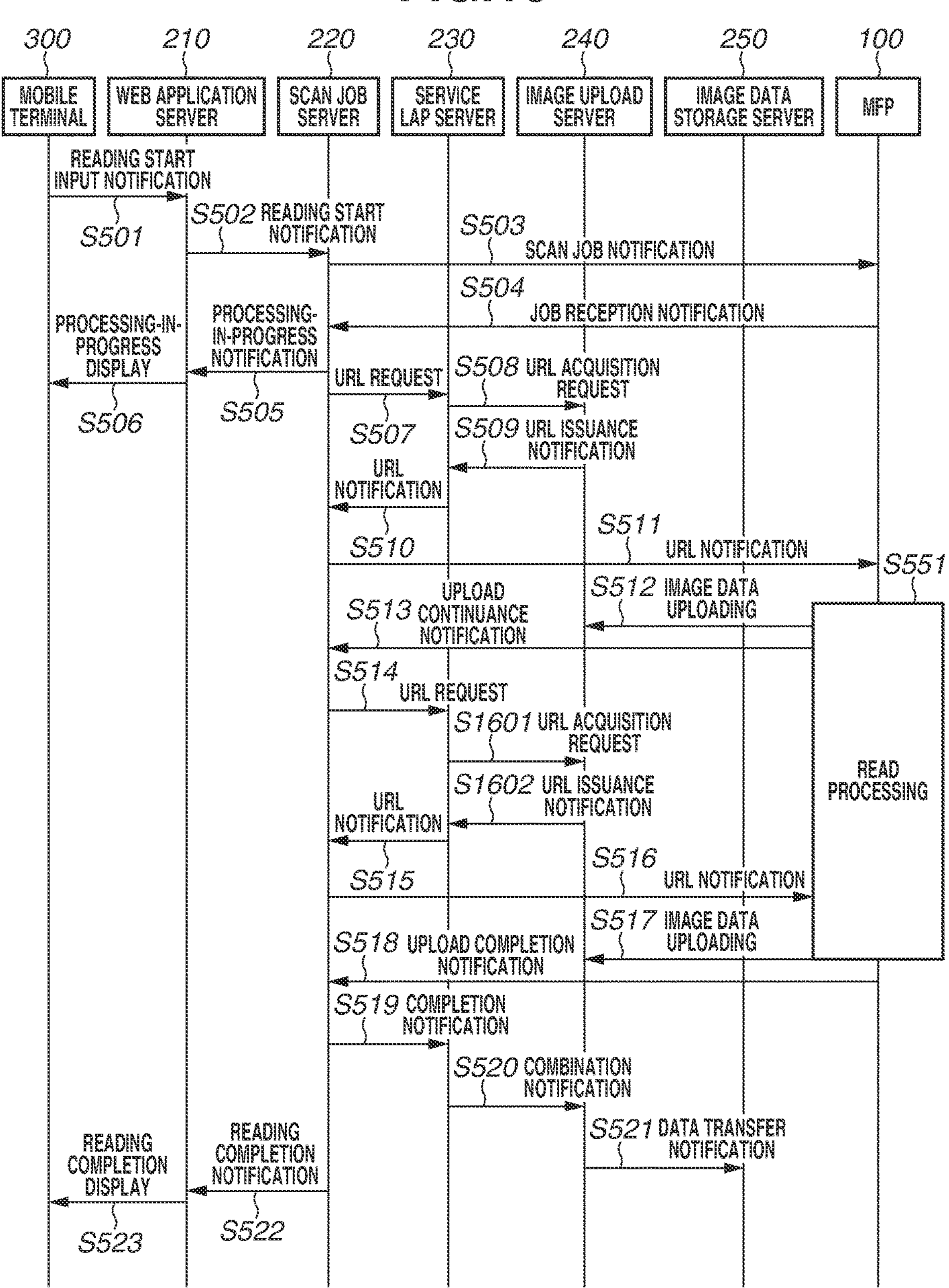
FIG. 16 is a sequence diagram illustrating image read processing according to another exemplary embodiment.

FIG. 16 is a sequence diagram illustrating the image read processing according to the second exemplary embodiment.

Processing other than a URL acquisition request (S1601) and a URL issuance notification (S1602) is the same as that in FIG. 5, and redundant descriptions thereof will be omitted.

Upon reception of the URL request transmitted by the scan job server 220 in step S514, then in step S1601, the service lap server 230 transmits the URL acquisition request to the image upload server 240.

Upon reception of the URL acquisition request transmitted by the service lap server 230 in step S1601, then in step S1602, the image upload server 240 issues a URL for uploading the image data by using the upload service. The URL issued in this case is the upload URL supplied with incremented upload count information.

The image upload server 240 further transmits the issued URL together with a URL issuance notification to the service lap server 230.

According to the present exemplary embodiment, the service lap server 230 transmits the URL acquisition request (S1601) to the image upload server 240 and receives the URL with the URL issuance notification (S1602) transmitted by the image upload server 240. This enables configuring the applicable cloud scan service 200 without the URL-related processing performed by the service lap server 230.

The image upload server 240 and the service lap server 230 may be provided as server instances in the same virtual computing server or provided in different servers.

The disclosure of the present exemplary embodiments includes the following configurations, method, and storage medium:

(Configuration 1)

An image reading system including a plurality of servers and an image reading apparatus connected with each other via a network, the image reading apparatus comprising:

- a first reception unit configured to receive from a second server an upload URL supplied with upload count information for transmitting image data to a first server;
- a first transmission unit configured to transmit image data to the upload URL when an amount of read image data reaches a predetermined amount or when read processing is completed;
- a first notification unit configured to notify the second server of a first notification indicating that a scan job has been received;
- a second notification unit configured to, when the read processing is continuing in image data transmission by the first transmission unit, notify the second server of a second notification indicating that the processing is continuing; and
- a third notification unit configured to, upon completion of the processing, notify the second server of a third notification indicating that the processing is completed, wherein the first server includes:

- a second reception unit configured to receive a predetermined amount of the image data from the image reading apparatus; and
- a combining unit configured to, in response to an instruction of the third server, combine the image data based on the upload count information, wherein the second server includes:

- a requesting unit configured to, upon reception of the first or the second notification, request the third server for a notification indicating that the second notification has been received and the upload URL;
- a second transmission unit configured to transmit the upload URL received from the third server to the image reading apparatus; and
- a third transmission unit configured to, upon reception of the third notification, transmit a fourth notification indicating that the read processing is completed to the third server, wherein the third server includes a fourth transmission unit configured to transmit to the second server the upload URL as the URL of the first server supplied with the upload count information, and wherein the fourth transmission unit includes an instruction unit configured to, upon reception of the notification indicating that the second notification has been received, transmit the upload URL supplied with incremented upload count information, and, upon reception of the fourth notification from the second server, instruct the first server to combine the transmitted image data.

(Configuration 2)

The image reading system according to configuration 1, wherein a mobile terminal is connected to the network, and wherein the mobile terminal transmits a user instruction to the image reading apparatus, and receives and displays information about the read processing of the image reading apparatus.

(Configuration 3)

The image reading system according to configuration 1, wherein communication in the network is HyperText Transfer Protocol (HTTP)-based communication.

(Configuration 4)

An image reading system including a plurality of servers and an image reading apparatus connected with each other via a network, the image reading apparatus comprising:

- a first reception unit configured to receive from a second server an upload URL supplied with upload count information for transmitting image data to a first server;

a first transmission unit configured to transmit image data to the upload URL when an amount of read image data reaches a predetermined amount or when read processing is completed;

a first notification unit configured to notify the second server of a first notification indicating that a scan job has been received;

a second notification unit configured to, when the read processing is continuing in image data transmission by the first transmission unit, notify the second server of a second notification indicating that the processing is continuing; and a third notification unit configured to, upon completion of the processing, notify the second server of a third notification indicating that the processing is completed, wherein the first server includes:

a second reception unit configured to receive a predetermined amount of the image data from the image reading apparatus; and a fourth transmission unit configured to transmit to the third server the upload URL as the URL of the first server supplied with the upload count information, wherein the fourth transmission unit includes a combining unit configured to, upon reception of a notification indicating that the second notification has been received, transmit the upload URL supplied with incremented upload count information, and, in response to an instruction of the third server, combine the image data based on the upload count information, wherein the second server includes:

a first requesting unit configured to, upon reception of the first or the second notification, request the third server for the notification indicating that the second notification has been received and/or an upload URL;

a second transmission unit configured to transmit the upload URL received from the third server to the image reading apparatus; and a third transmission unit configured to, upon reception of the third notification, transmit a fourth notification indicating that the read processing is completed to the third server, wherein the third server includes:

a second requesting unit configured to, upon reception of the notification indicating that the second notification has been received and/or a request for requesting the third server for an upload URL, request the first server for the upload URL; and an instruction unit configured to, upon reception of the fourth notification from the second server, instruct the first server to combine the transmitted image.

(Configuration 5)

The image reading system according to configuration 4, wherein a mobile terminal is connected to the network, and wherein the mobile terminal transmits a user instruction to the image reading apparatus, and receives and displays information about read processing of the image reading apparatus.

(Configuration 6)

The image reading system according to configuration 4, wherein communication in the network is HTTP-based communication.

Method

A method for controlling an image reading apparatus in an image reading system including a plurality of servers and the image reading apparatus connected with each other via a network, the method comprising:

first receiving for receiving from a second server an upload URL supplied with upload count information for transmitting image data to a first server;

first transmitting for transmitting image data to the upload URL when an amount of read image data reaches a predetermined amount or when read processing is completed, first notifying for notifying the second server of a first notification indicating that a scan job has been received;

second notifying for, when the read processing is continuing in image data transmission in the first transmission, notifying the second server of a second notification indicating that the processing is continuing; and third notifying for, upon completion of the processing, notifying the second server of a third notification indicating that the processing is completed.

(Storage Medium)

A non-transitory computer-readable storage medium storing a program for causing a computer to execute a method for controlling an image reading apparatus in an image reading system including a plurality of servers and the image reading apparatus connected with each other via a network, the method comprising:

first receiving for receiving from a second server an upload URL supplied with upload count information for transmitting image data to a first server;

first transmitting for transmitting image data to the upload URL when an amount of read image data reaches a predetermined amount or when read processing is completed;

first notifying for notifying the second server of a first notification indicating that a scan job has been received;

second notifying for, when the read processing is continuing in image data transmission in the first transmission, notifying the second server of a second notification indicating that the processing is continuing; and third notifying for, upon completion of the processing, notifying the second server of a third notification indicating that the processing is completed.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-020463, filed Feb. 14, 2023, which is hereby incorporated by reference herein in its entirety.

What is claimed is:

1. An image reading system including a plurality of servers and an image reading apparatus connected with each other via a network, the image reading apparatus comprising:

first one or more processors; and first at least one memory storing first instructions, which when executed by the first one or more processors, cause the image reading apparatus to perform:

first receiving of receiving from a second server an upload Uniform Resource Locator (URL) supplied with upload count information for transmitting image data to a first server;

first transmitting of transmitting image data to the upload URL when an amount of read image data reaches a predetermined amount or when read processing is completed;

first notifying of notifying the second server of a first notification indicating that a scan job has been received;

second notifying of, when the read processing is continuing in image data transmission in the first transmitting, notifying the second server of a second notification indicating that the processing is continuing; and third notifying of, upon completion of the processing, notifying the second server of a third notification indicating that the processing is completed, wherein the first server includes:

second one or more processors; and second at least one memory storing second instructions, which when executed by the second one or more processors, cause the first server to perform:

second receiving of receiving a predetermined amount of the image data from the image reading apparatus; and in response to an instruction of a third server, combining the image data based on the upload count information, wherein the second server includes:

third one or more processors; and third at least one memory storing third instructions, which when executed by the third one or more processors, cause the second server to perform:

upon reception of the first or the second notification, requesting the third server for a notification indicating that the second notification has been received and the upload URL;

second transmitting of transmitting the upload URL received from the third server to the image reading apparatus; and third transmitting of, upon reception of the third notification, transmitting a fourth notification indicating that the read processing is completed to the third server, wherein the third server transmits to the second server the upload URL as the URL of the first server supplied with the upload count information, and wherein the third server, upon reception of the notification indicating that the second notification has been received, transmits the upload URL supplied with incremented upload count information, and, upon reception of the fourth notification from the second server, instructs the first server to combine the transmitted image data.

2. The image reading system according to claim 1, wherein a mobile terminal is connected to the network, and wherein the mobile terminal transmits a user instruction to the image reading apparatus, and receives and displays information about the read processing of the image reading apparatus.

3. The image reading system according to claim 1, wherein communication in the network is HyperText Transfer Protocol (HTTP)-based communication.

4. An image reading system including a plurality of servers and an image reading apparatus connected with each other via a network, the image reading apparatus comprising:

first one or more processors; and first at least one memory storing first instructions, which when executed by the first one or more processors, cause the image reading apparatus to perform:

first receiving of receiving from a second server an upload Uniform Resource Locator (URL) supplied with upload count information for transmitting image data to a first server;

first transmitting of transmitting image data to the upload URL when an amount of read image data reaches a predetermined amount or when read processing is completed;

first notifying of notifying the second server of a first notification indicating that a scan job has been received;

second notifying of, when the read processing is continuing in image data transmission in the first transmitting, notifying the second server of a second notification indicating that the processing is continuing; and third notifying of, upon completion of the processing, notifying the second server of a third notification indicating that the processing is completed, wherein the first server includes:

second one or more processors; and second at least one memory storing second instructions, which when executed by the second one or more processors, cause the first server to perform:

second receiving of receiving a predetermined amount of the image data from the image reading apparatus; and fourth transmitting of transmitting to a third server the upload URL as the URL of the first server supplied with the upload count information, wherein the fourth transmitting includes, upon reception of a notification indicating that the second notification has been received, transmitting the upload URL supplied with incremented upload count information, and, in response to an instruction of the third server, combining the image data based on the upload count information, wherein the second server includes:

third one or more processors; and third at least one memory storing third instructions, which when executed by the third one or more processors, cause the second server to perform:

first requesting of, upon reception of the first or the second notification, requesting the third server for the notification indicating that the second notification has been received and/or an upload URL;

second transmitting of transmitting the upload URL received from the third server to the image reading apparatus; and third transmitting of, upon reception of the third notification, transmitting a fourth notification indicating that the read processing is completed to the third server, and wherein the third server includes:

fourth one or more processors; and fourth at least one memory storing fourth instructions, which when executed by the fourth one or more processors, cause the third server to perform:

second requesting of, upon reception of the notification indicating that the second notification has been received and/or a request for requesting the third server for an upload URL, requesting the first server for the upload URL; and upon reception of the fourth notification from the second server, instructing the first server to combine the transmitted image.

5. The image reading system according to claim 4, wherein a mobile terminal is connected to the network, and wherein the mobile terminal transmits a user instruction to the image reading apparatus, and receives and displays information about the read processing of the image reading apparatus.

6. The image reading system according to claim 4, wherein communication in the network is HyperText Transfer Protocol (HTTP)-based communication.

7. A method for controlling an image reading apparatus in an image reading system including a plurality of servers and the image reading apparatus connected with each other via a network, the method comprising:

at the image reading apparatus:

receiving from a second server an upload Uniform Resource Locator (URL) supplied with upload count information for transmitting image data to a first server;

transmitting image data to the upload URL when an amount of read image data reaches a predetermined amount or when read processing is completed;

first notifying of notifying the second server of a first notification indicating that a scan job has been received;

second notifying of, when the read processing is continuing in image data transmission in the transmitting, notifying the second server of a second notification indicating that the processing is continuing; and third notifying of, upon completion of the processing, notifying the second server of a third notification indicating that the processing is completed, wherein the first server:

receives a predetermined amount of the image data from the image reading apparatus; and in response to an instruction of a third server, combines the image data based on the upload count information, wherein the second server:

upon reception of the first or the second notification, requests the third server for a notification indicating that the second notification has been received and the upload URL;

transmits the upload URL received from the third server to the image reading apparatus; and upon reception of the third notification, transmits a fourth notification indicating that the read processing is completed to the third server, and wherein the third server:

transmits to the second server the upload URL as the URL of the first server supplied with the upload count information;

upon reception of the notification indicating that the second notification has been received, transmits the upload URL supplied with incremented upload count information; and upon reception of the fourth notification from the second server, instructs the first server to combine the transmitted image data.

8. A non-transitory computer-readable storage medium storing one or more programs including instructions, which when executed by one or more processors of an image reading apparatus in an image reading system including a plurality of servers and the image reading apparatus connected with each other via a network, cause the image reading apparatus to perform a method comprising:

receiving from a second server an upload Uniform Resource Locator (URL) supplied with upload count information for transmitting image data to a first server;

transmitting image data to the upload URL when an amount of read image data reaches a predetermined amount or when read processing is completed;

first notifying of notifying the second server of a first notification indicating that a scan job has been received;

second notifying of, when the read processing is continuing in image data transmission in the transmitting, notifying the second server of a second notification indicating that the processing is continuing; and third notifying of, upon completion of the processing, notifying the second server of a third notification indicating that the processing is completed, wherein the first server:

receives a predetermined amount of the image data from the image reading apparatus; and in response to an instruction of a third server, combines the image data based on the upload count information, wherein the second server:

upon reception of the first or the second notification, requests the third server for a notification indicating that the second notification has been received and the upload URL;

transmits the upload URL received from the third server to the image reading apparatus; and upon reception of the third notification, transmits a fourth notification indicating that the read processing is completed to the third server, and wherein the third server:

transmits to the second server the upload URL as the URL of the first server supplied with the upload count information;

upon reception of the notification indicating that the second notification has been received, transmits the upload URL supplied with incremented upload count information; and upon reception of the fourth notification from the second server, instructs the first server to combine the transmitted image data.

* * * * *